United States Patent

Makino et al.

[11] Patent Number: 5,877,912
[45] Date of Patent: Mar. 2, 1999

[54] VIDEO TAPE RECORDER WITH CASSETTE DETECTING SENSOR

[75] Inventors: Hideo Makino, Tsuyama; Moriyasu Yoshitake, Tokyo, both of Japan

[73] Assignee: Funai Electric Co., Ltd., Osaka, Japan

[21] Appl. No.: 868,856

[22] Filed: Jun. 4, 1997

Related U.S. Application Data

[63] Continuation of Ser. No. 566,253, Dec. 1, 1995, abandoned, which is a continuation of Ser. No. 144,292, Oct. 27, 1993, abandoned.

[30] Foreign Application Priority Data

Oct. 28, 1992 [JP] Japan .................................. 4-312933

[51] Int. Cl.$^6$ .................................................. G11B 15/00
[52] U.S. Cl. ........................................... 360/69; 360/71
[58] Field of Search .............................. 360/69, 71, 137, 360/83, 90, 722

[56] References Cited

U.S. PATENT DOCUMENTS

| | | | |
|---|---|---|---|
| 3,960,254 | 6/1976 | Fial et al. .................................. | 360/69 |
| 4,318,139 | 3/1982 | Shibata et al. ............................ | 360/71 |
| 4,488,186 | 12/1984 | Terui ........................................ | 360/71 |
| 4,573,088 | 2/1986 | Kommoss ................................. | 360/71 |
| 4,800,449 | 1/1989 | Yamasaki ................................. | 360/71 |
| 4,879,705 | 11/1989 | Aoyagi et al. ..................... | 360/72.2 X |
| 4,984,098 | 1/1991 | Buntsis .................................... | 360/69 |
| 5,053,894 | 10/1991 | Sakai ....................................... | 360/69 |
| 5,291,343 | 3/1994 | Goto ........................................ | 386/96 |
| 5,313,344 | 5/1994 | Sakaguchi et al. ...................... | 360/71 |
| 5,796,538 | 8/1998 | Ji et al. ................................ | 360/69 X |

FOREIGN PATENT DOCUMENTS 56165947  12/1981  Japan .

OTHER PUBLICATIONS

Sharp GF-7600 owner's Manual pp 1-13, date determined Dec. 31, 1983.

*Primary Examiner*—Aristotelis M. Psitos
*Assistant Examiner*—K. Wong
*Attorney, Agent, or Firm*—Lackenbach Siegel Aronson & Greenspan, P.C.

[57] ABSTRACT

A magnetic recorder and/or a regenerator which deletes a troublesome key operation at the time of regeneration and improve operability is provided. A play key operation detecting means which detects that the play key is on in a power-off state and outputs a detecting signal and a play operation practical means which practices the play operation together with supplying the power to the indicator portion, tape deck, servo circuit and the video-audio circuit based upon the detecting signal outputted from the play key detecting means.

1 Claim, 4 Drawing Sheets

VIDEO TAPE RECORDER WITH CASSETTE DETECTING SENSOR

This application is a continuation of application Ser. No. 08/566,253, filed Dec. 1, 1995 now abandoned which is a continuation of application Ser. No. 08/144,292, filed Oct. 27, 1993, now abandoned.

BACKGROUND OF THE INVENTION

This invention relates to a magnetic recorder and/or a regenerator (e.g., video tape recorder and video tape player) with improved convenience.

FIG. 3 is a block view which shows a structure of a conventional video tape recorder. In FIG. 3, 51 is a power source circuit, 52 is a key input portion provided with a generative key, recording key, and a channel selection key, 53 is an indicator portion having a light-emitting diode (LED) which shows various kinds of operations, 54 is a tape deck provided with a tape head-driving mechanism and the like, 55 is a servo circuit which controls the tape head-driving mechanism of the tape deck 54, 56 is a video-audio circuit, to which a speaker 57 and a cathode ray tube (CRT) display 58 and the like are connected.

The numeral 59 is a control portion which is provided with a microcomputer for system control.

An operation is next described. FIG. 4 is a flow chart explaining the operation of a conventional video tape recorder.

When a conventional video tape recorder is connected to an AC 100 V, power is supplied to a microcomputer of the control portion 59, whereby the video tape recorder system is initialized to start. It is judged whether or not the power switch is on (step S1). When it is judged that the power switch is on, the indicator portion 53, tape deck 54, servo circuit 55, video-audio circuit 56 and the like are connected to the power source to be switched over to a state of waiting (step S2).

The key input is then detected (step S3). When the inputted key is a channel key (step 4), a channel is treated and becomes a key input waiting state (step S4A). In the case of a power switch (step S5), the power off instruction is performed (step S5A). Further, in the case of a regeneration key (step S6), the set condition of the tape is detected (step S7). In this case, if the tape is not set, it returns to an input waiting state, and if the tape is set, the regeneration treatment is started to await the key input (step S8). When a key other than the regenerative one is input, a treatment corresponding to this is carried out to return to a state for awaiting key input (step S6A).

In FIG. 4, each operation is carried out by key input. However, other than this, various kinds of operations are initiated and completed by detecting the initial and end portions of the tape and the detection of time thereof.

Since the conventional video tape recorder is structured as above, if the video tape recorder is used, the power switch must be power on first and then the regenerative keys, etc., are operated. Accordingly, problems occur at the time of use of the video tape recorder.

This invention solves the above problems and its object is to remove the troublesome problems of key operation at the time of regeneration, thereby providing a video tape recorder with increased operability.

BRIEF DESCRIPTION OF THE INVENTION

A magnetic recorder and/or regenerator according to this invention is characterized by being provided with:

a key input portion having a power source circuit, power switch, regenerative key, channel selection key and the like;

a tape deck provided with an indicator portion which shows various kinds of operations and a tape head-driving mechanism and the like;

a servo circuit which controls the above tape head-driving mechanism;

a regenerative key operation detecting means which detects that the regenerative key is on in a power-off state in the magnetic recorder and/or regenerator having a video-audio circuit, and outputs a detecting signal; and a play operation practical means which practices the play operation together with supplying the power to the above indicator portion, tape deck, servo circuit and the video audio circuit based upon the detecting signal outputted from the regenerative key operation detecting means.

The magnetic recorder and/or the regenerator detects that the regenerator is on in the power-off state, thereby supplying the power to the indicator portion, tape deck, servo circuit, and video-audio circuit to perform the regenerative operation by transferring to the regenerative mode. Accordingly, since the play operation can be carried out only by putting the regenerative key on directly from the power-off state without operation of the power switch, there is no need to operate the power switch at the time of use of the magnetic recorder and/or regenerator and operation efficiency is thereby improved.

BRIEF DESCRIPTION OF THE DRAWINGS

The object and features of the present invention will become more readily apparent from the following detailed description of the invention taken in conjunction with the accompanying drawings in which.

DETAILED DESCRIPTION OF THE INVENTION

An embodiment of this invention is described as follows.

Figure 1:
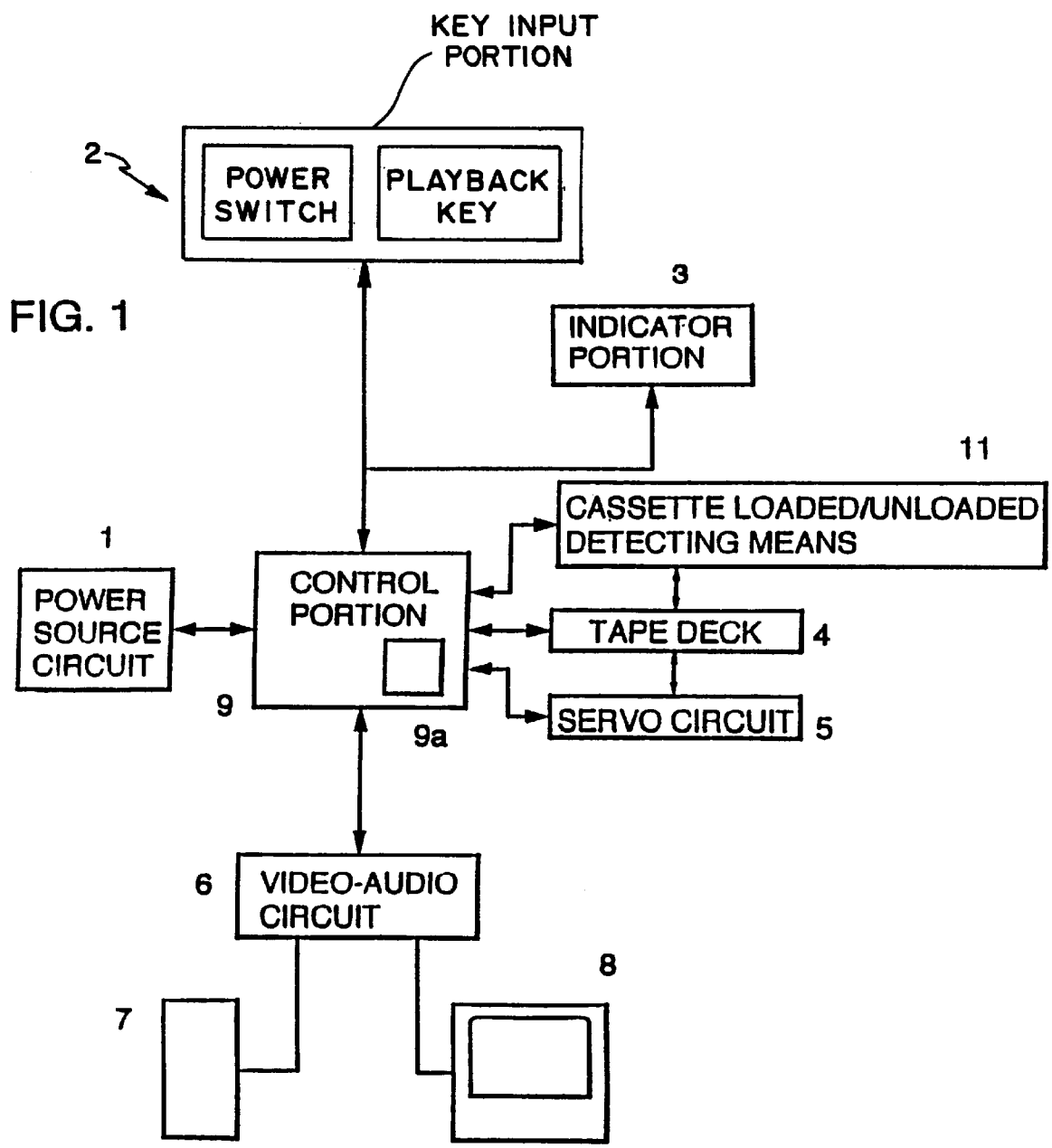
FIG. 1 is a block view which shows the structure of the video tape recorder according to an embodiment of this invention.

FIG. 1 is a block view which shows the structure of the video tape recorder of this embodiment. In FIG. 1, 1 is a power source circuit, 2 is a key input portion having a power switch, regenerative key, picture recording key, channel selection key, and the like, 3 is an indicator portion provided with a LED (light-emitting diode) which shows various kinds of operations, 4 is a tape deck having a tape head-driving mechanism and the like, 5 is a servo circuit which controls the tape head-driving mechanism and the like, 6 is a video-audio circuit, to which a speaker 7, CRT (cathode ray tube) display device 8 and the like are connected.

The numeral 9 is a control portion provided with a microcomputer for system control. This microcomputer is provided with a memory wherein are stored a detecting program for regenerating key operation which is a detecting means for regenerative key operation which detects that the regenerative key is on in a power-off state and produces a detecting signal, and practice program of a play operation by transferring the above detecting signal to a play mode.

The numeral 9a is a power supplying circuit which feeds the power directly to the above indicator portion 3, tape deck 4, servo circuit 5 and video-audio circuit 6 without use of the power switch based upon the detecting signal produced by practicing the above detecting program for regenerative key operation.

The numeral 11 is a cassette loaded/unloaded detecting means, and usually a push switcher or an optical sensor is used as the detecting means.

Figure 2:
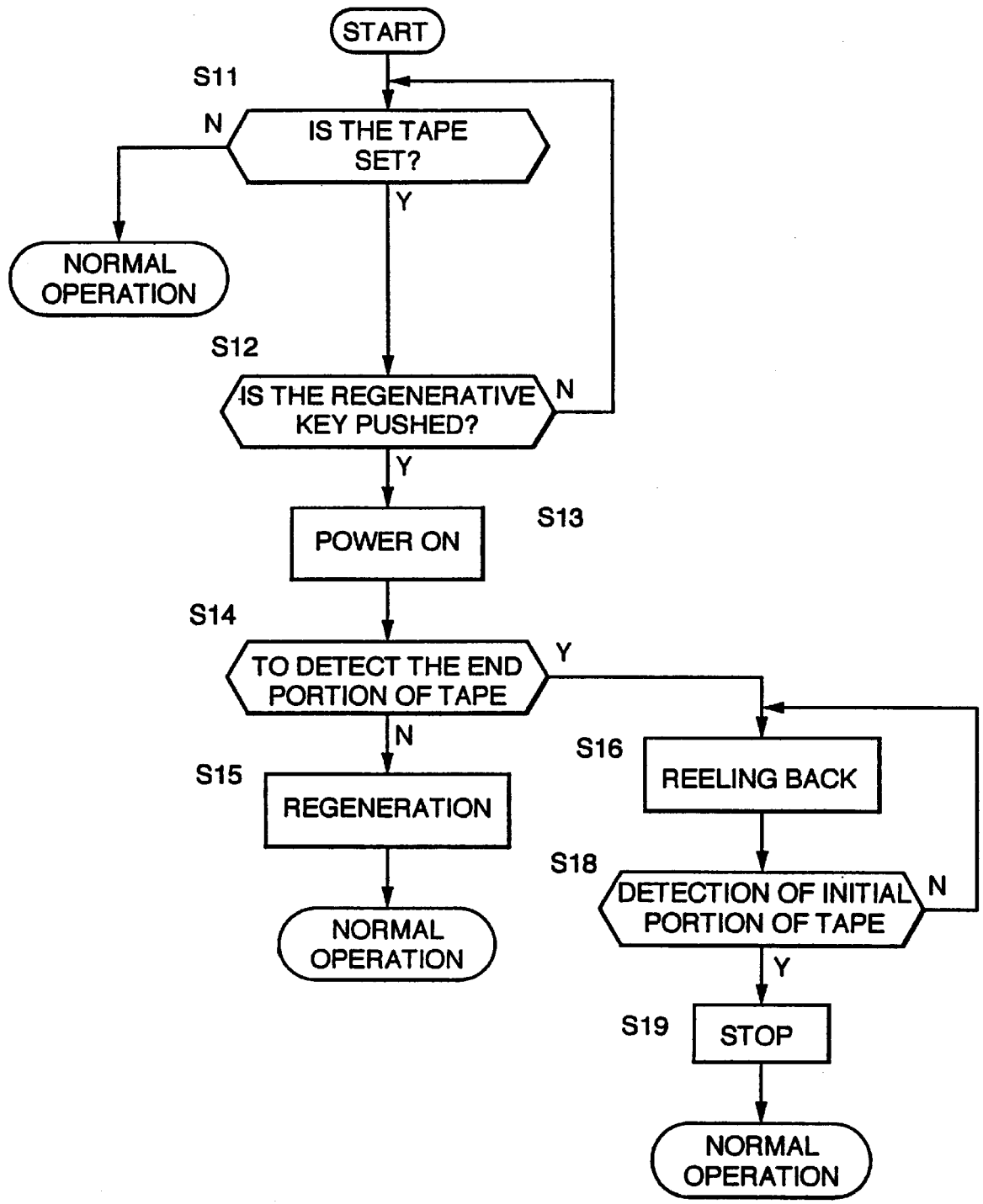
FIG. 2 is a flow chart explaining the operation of the video tape recorder according to an embodiment of this invention.
Figure 3:
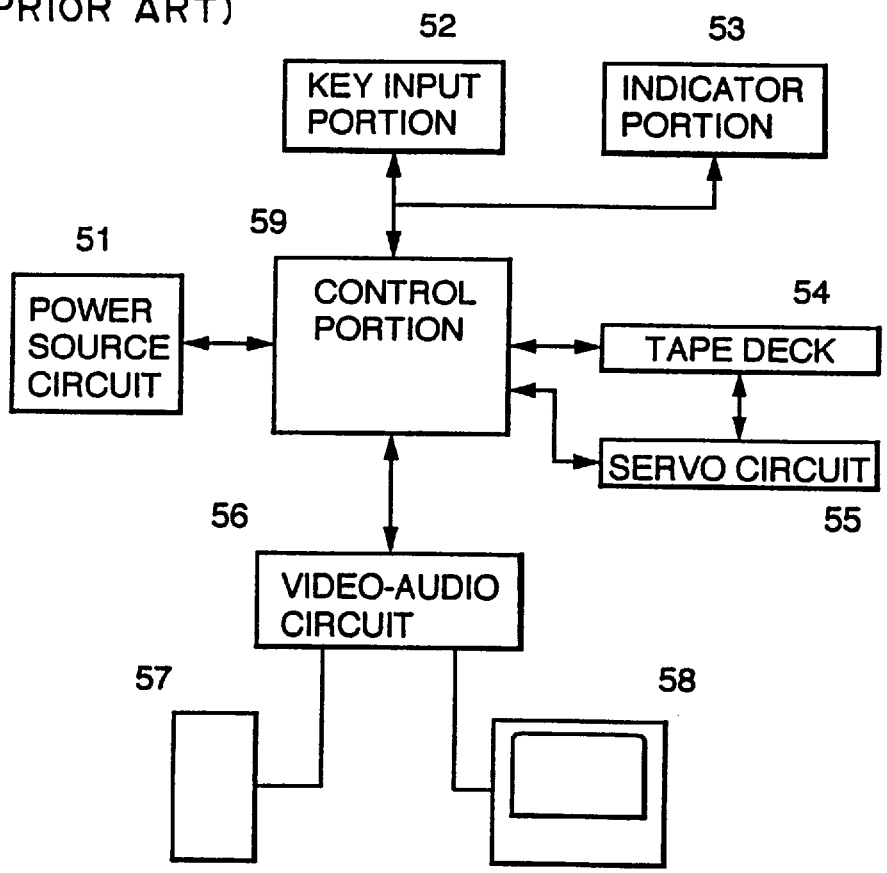
FIG. 3 is a block view which shows the structure of the conventional video tape recorder.

The operation is next explained. FIG. 2 is a flow chart explaining the operation of the video tape recorder which uses this invention.

In this video tape recorder, when connected to AC 100 V, the power is supplied to the microcomputer at the control portion 9 and the system is initialized. It is then judged whether or not the tape is set (step S11). If the tape is not set, the system transfers to normal operation. On the other hand, if the tape is set, it is judged whether or not the regenerative key is on in the off-state of the power switch (step S12). The judgment whether or not the regenerative key is on in this state is carried out by the detecting program of the regenerative key operation which is a detecting means of the regenerative key operation. Further, in this case, when the power switch is on, the operation is the same as the conventional program as shown in the flow chart.

In step S12, when the regenerative key is pushed, the power-supplying circuit 9a supplies power to the indicator portion 3, tape deck 4, servo circuit 5, and video-audio circuit 6 based upon the detecting signal produced by the detecting program for regenerative key operation without use of the power switch (step S13).

Figure 4:
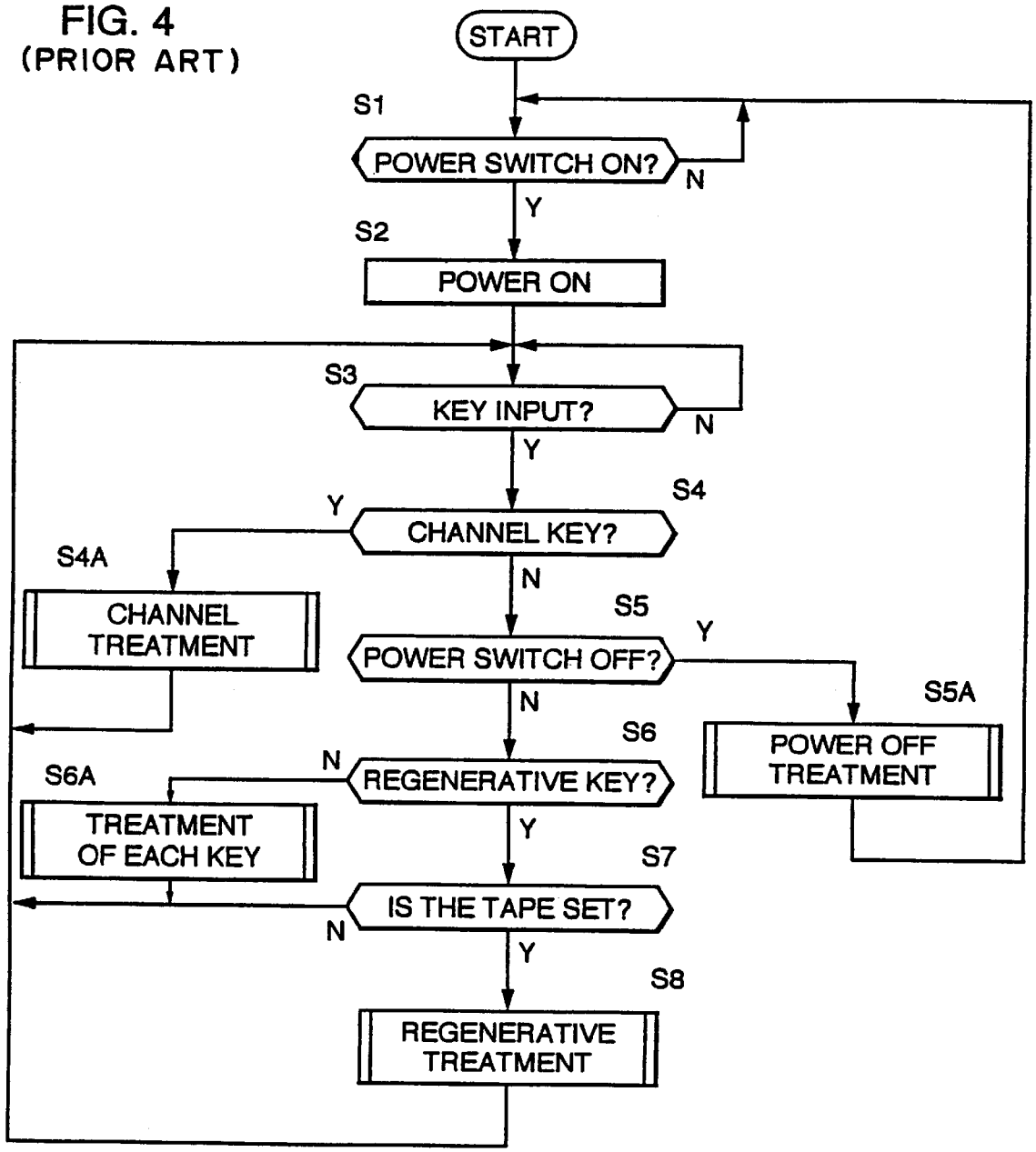
FIG. 4 is a flow chart explaining the operation of the conventional video tape recorder.

Then, it is detected whether or not the set tape is an end portion, and if it is a tape end, the tape is reeled back until the initial portion of the tape is detected and is stopped (step 16, step S18). If the end portion of the tape is not detected, the regeneration is initiated (step 15). When an initial portion of the tape is detected in step S18, the flow chart proceeds to step S19, the reeling back is stopped and transfers to the conventional operation in FIG. 4 in the waiting state of key input.

As described above, in this embodiment, when the regeneration is carried out with the power switch off, the regenerative operation is initiated by simply operating the regenerative key without operating the power switch.

Although a video tape recorder having a 100 V power source is indicated as an embodiment of this invention, power sources other than the 100 V power source may be used if they are general business ones.

As described above, when this invention is used, since the regenerative operation can be performed by operating the regenerative key directly from the power-off state, there is no need of the power switch operation when the magnetic recording regenerator is used, and the operation effect can be improved.

What is claimed is:

1. A playback device, comprising: a playback deck for receiving an information storage and storage medium and for playing back information stored on said medium when electric power is applied thereto; a power source for supplying electric power, power switch means for selectively applying electric power from said power source to said playback deck; playback switch means for enabling said playback deck to start playback of said medium; first detection means for detecting whether said medium is set in said playback deck; second detection means for detecting whether said playback switch means is set for enabling playback of said medium; and control means for applying electric power from said power source to said playback deck only in response to detection by said first detection means that said medium is set in said playback deck and detection by said second detection means that said playback switch means is set for enabling playback independently of whether said power switch means is set to on or off positions to apply or not to apply electric power to said playback deck.

* * * * *